US011774986B1

(12) United States Patent
Meiswinkel

(10) Patent No.: US 11,774,986 B1
(45) Date of Patent: Oct. 3, 2023

(54) STABILIZATION OF AUTONOMOUS VEHICLES USING ELECTROMAGNETIC FORCE

(71) Applicant: Amazon Technologies, Inc., Seattle, WA (US)

(72) Inventor: Kent Belden Meiswinkel, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 252 days.

(21) Appl. No.: 17/102,703

(22) Filed: Nov. 24, 2020

(51) Int. Cl.
| | |
|---|---|
| *G05D 1/08* | (2006.01) |
| *G05D 1/02* | (2020.01) |
| *G01G 19/12* | (2006.01) |
| *B65G 1/137* | (2006.01) |

(52) U.S. Cl.
CPC ......... *G05D 1/0891* (2013.01); *B65G 1/1375* (2013.01); *G01G 19/12* (2013.01); *G05D 1/0259* (2013.01); *G05D 2201/0216* (2013.01)

(58) Field of Classification Search
CPC ............... G05D 1/0259; G05D 1/0891; G05D 2201/0216; G05D 1/101; B65G 1/1373; B65G 1/1375

See application file for complete search history.

(56) References Cited

U.S. PATENT DOCUMENTS

| | | | |
|---|---|---|---|
| 11,110,593 B2 * | 9/2021 | Tarbaieva | B65G 1/0464 |
| 2016/0236867 A1 * | 8/2016 | Brazeau | B25J 5/007 |
| 2022/0057797 A1 * | 2/2022 | Ramsager | G06K 7/1413 |

FOREIGN PATENT DOCUMENTS

WO  WO-2019224282 A1 * 11/2019 ........... B65G 1/0492

\* cited by examiner

*Primary Examiner* — Nicholas Kiswanto
*Assistant Examiner* — Christopher A Buksa
(74) *Attorney, Agent, or Firm* — Eversheds Sutherland (US) LLP

(57) ABSTRACT

Systems, methods, and computer-readable media are disclosed for stabilization of autonomous vehicles using electromagnetic force. In one embodiment, an example autonomous vehicle may include a base comprising a first side and a second side, and a first container handling assembly coupled to the base. The first container handling assembly may be configured to support a first stack of containers, and may be configured to extend from the autonomous vehicle in a first direction over the first side of the base. The autonomous vehicle may include a first electromagnet coupled to the base along the second side, and a controller configured to energize the first electromagnet when the first container handling assembly is in an extended position in the first direction, such that the autonomous vehicle is stabilized via an electromagnetic force generated by the first electromagnet.

19 Claims, 8 Drawing Sheets

STABILIZATION OF AUTONOMOUS VEHICLES USING ELECTROMAGNETIC FORCE

BACKGROUND

As users increasingly make online purchases, fulfilment of such purchases and other orders may become increasingly complicated. For example, a fulfillment center may have output of upwards of one million packages per day. Such packages, as well as other containers, may be transported using trucks, trailers, and other equipment. With such demands, efficiency of logistics related to processing orders and packages may be important. Accordingly, improvements in various operations of order fulfillment, such as improvements to picking technology, sorting technology, packing technology, and so forth may be desired, such that throughput can be increased and sustainability can be improved.

Figure 1:
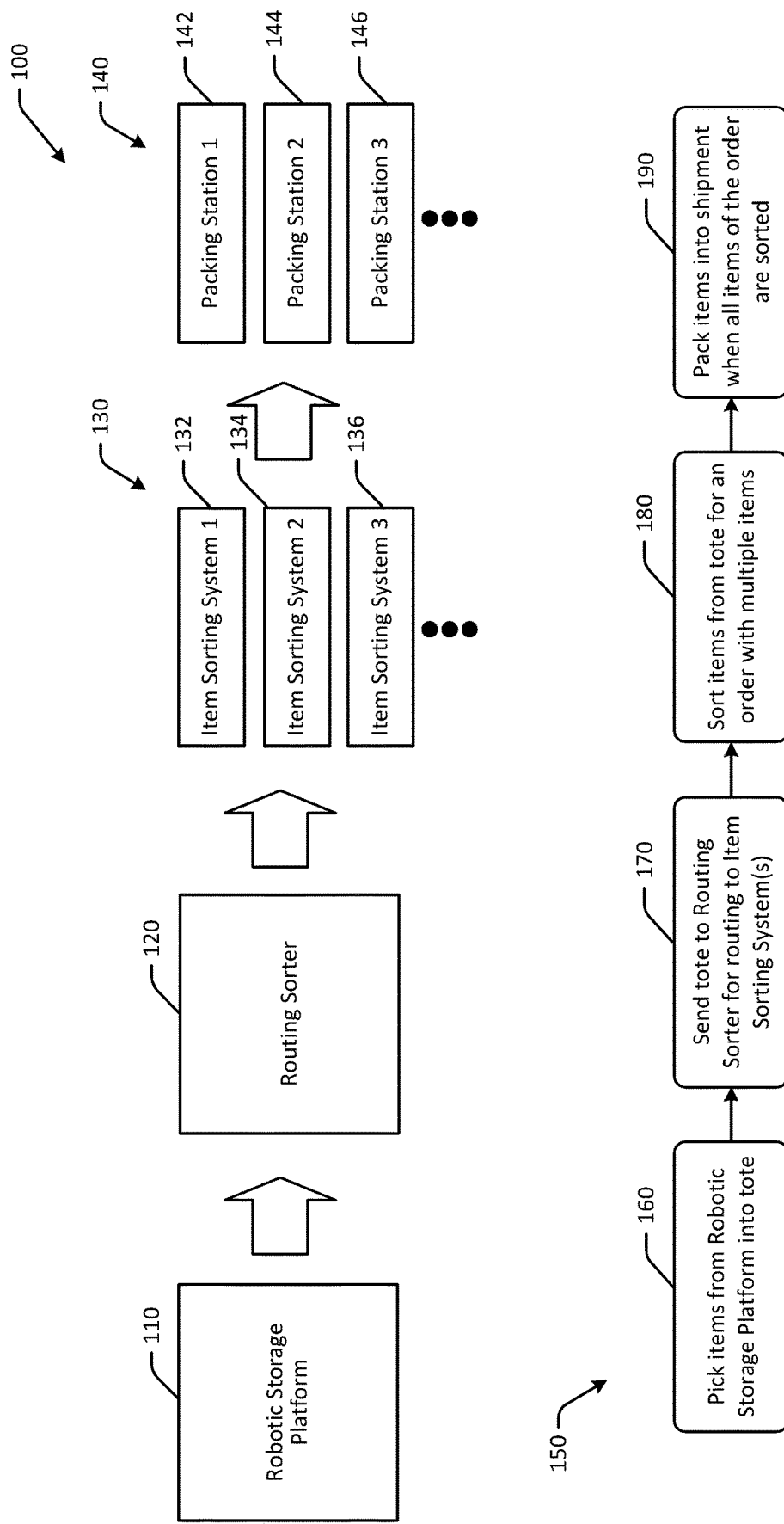
FIG. 1 is a hybrid schematic illustration of an example use case for stabilization of autonomous vehicles using electromagnetic force and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. Furthermore, packages and/or other containers may be loaded into trailers or other vehicles for transportation. As a result, transportation of products and/or shipping of packages in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. For example, products in the same order may be directed to the same packing location for consolidation and subsequent packing. However, a tote or other container may include products that are to be sorted to multiple different packing locations, and the sortation process may be slowed by sheer volume of products that are to be processed and/or sorted. In addition, in some instances, items that are part of the same order may not all be in the same fulfillment center or other location. For example, a first product in an order of two items may be at a first fulfillment center, and a second product in the same order may be at a second fulfillment center. In such instances, instead of shipping the two items in the order separately, such as one from each fulfillment center, items may be transferred from one fulfillment center to another, and then aggregated with other items in the order and shipped together.

Such fulfillment center-to-fulfillment center transfers of items may be processed similar to items that are to be shipped to consumers. For example, the items to be transferred may be picked, routed to a sortation machine, sorted into a particular container (e.g., a container designated for a particular fulfillment center, etc.), packed, and sent. To send the containers, the containers may be stacked in a trailer or other vehicle for transport.

Handling containers that may be full of items or at least partially filled with items may be difficult for robotic systems. In particular, handling stacks of containers may be even more difficult as items can shift within a container during movement, and more than one container in a stack may be difficult to handle due to weight and balance requirements, while maintaining a safe environment. For example, during movement of one or more containers in a stack of containers, maintaining balance of a robotic system, such as an autonomous vehicle (e.g., a cart, a forklift, a carrier, etc.), may be difficult due to changes in center of mass, tipping moments caused by the change in container stack position, and so forth.

Embodiments of the disclosure include systems and methods for stabilization of autonomous vehicles using electromagnetic force. For example, in some fulfillment center environments, floor space may be limited, which may make the use of mechanical stabilization systems (e.g., stanchions, floor locks, etc.) difficult or impractical. Embodiments of the disclosure provide systems and methods to utilize electromagnetic force in such environments to provide stabilization to autonomous and/or non-autonomous vehicles with a limited impact on floor space utilization. For example, some embodiments may include autonomous vehicles, such as autonomous carts, forklifts, pallet jacks, or other vehicles, that include one or more electromagnets coupled thereto, where the electromagnets can be energized using a battery of the vehicle to generate an electromagnetic force between the autonomous vehicle and a metal plate disposed on a floor of the fulfillment center. The electromagnetic force can be adjusted to provide the desired amount of stabilization, and can stabilize the vehicle during loading and/or unloading of containers, so as to avoid accidental tipping and other issues that may be caused by movement of stacks of one or more containers. Some embodiments may include controllers configured to determine which electromagnets are to be activated, the amount of current to provide, and/or a length of time of energizing so as to minimize impact on battery life. Although embodiments are discussed and depicted as including electromagnets coupled to vehicles, in other embodiments, steel plates may be coupled to vehicles, and electromagnetic components may be coupled to a floor of a facility.

Embodiments may therefore increase throughput and speed of consolidating items for multi-item orders and/or consolidating packages or containers that are destined for certain related destinations, such as other fulfillment centers. Some embodiments include optimized process flows for processing of orders at fulfillment centers, as well as process flows or equipment to increase speed of consolidating products in a multi-item order and/or speed of sorting packages. As a result, throughput of fulfillment centers may be improved, and/or logistics of fulfillment center operations may be less complicated.

Referring to FIG. 1, an example use case 100 for stabilization of autonomous vehicles using electromagnetic force and an example process flow in accordance with one or more embodiments of the disclosure. Although discussed in the context of online orders, other embodiments may be directed to any suitable use case where products are picked and sorted, or packages or containers are sorted, such as instances where users may pick up orders rather than receiving a shipment, instances where items are aggregated for transport to another fulfillment center, and so forth.

In FIG. 1, a fulfillment center may include a robotic storage platform 110, a routing sorter 120, one or more item sorting systems 130, and one or more packing stations 140. The robotic storage platform 110 may be a portion of the fulfillment center at which products picked from product inventory are placed. Robots may be used to pick products from inventory and to deliver to the robotic storage platform in some instances, while in other instances, manual effort or a combination thereof may be used to pick products. The picking process at the robotic storage platform may include locating a product in an order, obtaining the product, and sending the product to the robotic storage platform 110, such as via a conveyor belt. In the illustrated embodiment, products at the robotic storage platform 110 may be placed in a container, such as a tote. The tote may optionally be assigned to, or otherwise associated with, a particular item sorting system machine. For example, a certain tote may be associated with a certain item sorting system, such that products that are designated to be picked and placed in the tote are for orders that are to be consolidated at that particular item sorting system. The association between the tote and the item sorting system may be static in some instances. In other embodiments, there may not be any association between totes and item sorting systems, or associations may be dynamic.

At the routing sorter 120, totes including products that have been picked may be routed to the appropriate or designated item sorting system. For example, the routing sorter 120 may optionally determine an identifier associated with the tote, and may determine one or more item sorting systems to which the tote is to be routed using the identifier or using another factor, such as sortation system load. The routing sorter 120 may route or direct the tote to an item sorting system.

The item sorting systems 130 may include one or more item sorting system machines. In FIG. 1, a first item sorting system 132, a second item sorting system 134, a third item sorting system 136, and so forth may be included. Any number of item sorting systems may be included. Some or all of the item sorting systems may optionally be associated with certain totes. The item sorting systems may be used to consolidate or otherwise aggregate products for single or multi-item orders and/or for transfer to a different fulfillment center. For example, a first tote may include a first item of a multi-item order, and a second tote may include a second item of the multi-item order. The item sorting system may therefore identify the orders associated with the respective products in a tote, and may transport the products to a container, such as a tote, a flexible container, a specific chute leading to a container, or a different container associated with the order. When the order is complete with all of the products in the associated chute or container, the order may be packed. In instances where a container is designated for a different fulfillment center, as opposed to an online order, the container may be packed when full, as opposed to when certain items are placed into the container (e.g., there may not be any specific items that need to be in the container before packing, rather, the container may just be a certain threshold full, etc.). Accordingly, a specific item sorting system may be designated for fulfillment of a particular multi-item order. As a result, all of the products in the multi-item order may be placed in totes that are directed to that particular item sorting system. At the item sorting systems 130, totes that are received via the routing sorter 120 may be emptied, and the products in the respective totes may be transported to the appropriate chutes or containers for the orders for which the products were picked.

After a single or multi-item order is complete (e.g., the item sorting system has delivered all of the products in the order to the appropriate chute, container, etc.), or when a container designated for another fulfillment center is full (where full is a configurable threshold, such as about 60% full capacity, 70% full capacity, 80% full capacity, 90% full capacity, etc.), the order may be packed at the packing station 140. In some embodiments, one or more packing stations may be included. In some instances, a packing station may service more than one item sorting system, while in other instances, more than one packing station may service one item sorting system. In the illustration of FIG. 1, a first packing station 142 may be used to pack orders from the first item sorting system 132, a second packing station 144 may be used to pack orders from the second item sorting system 134, a third packing station 146 may be used to pack orders from the third item sorting system 136, and so forth. At the packing stations 140, the orders may be placed into boxes and sealed for subsequent shipment. The packages may then be processed for shipment to the user. In another example, the containers may be stacked, closed, or otherwise packed for shipment to another fulfillment center. At any stage along the process, one or more stacks of containers may be transported from one location to another via the use of autonomous vehicles, such as autonomous robots. In some embodiments, at various pick up and drop off locations for the stacks of containers, electromagnetic force may be used to stabilize the vehicles during loading and/or unloading of containers from the vehicle.

At the fulfillment center, an example process flow 150 illustrated in FIG. 1 may be implemented to improve the efficiency and/or throughput of the fulfillment center. At a first block 160, items may be picked from the robotic storage platform 110 into a tote that may optionally be associated with a specific item sorting system. At a second block 170, the tote may be sent to the routing sorter 120 for routing to an item sorting system. At a third block 180, the items from the tote may be sorted for an order with multiple item by the specific item sorting system. At a fourth block 190, the items may be packed into a shipment when all of the items in the order are sorted.

Figure 2:
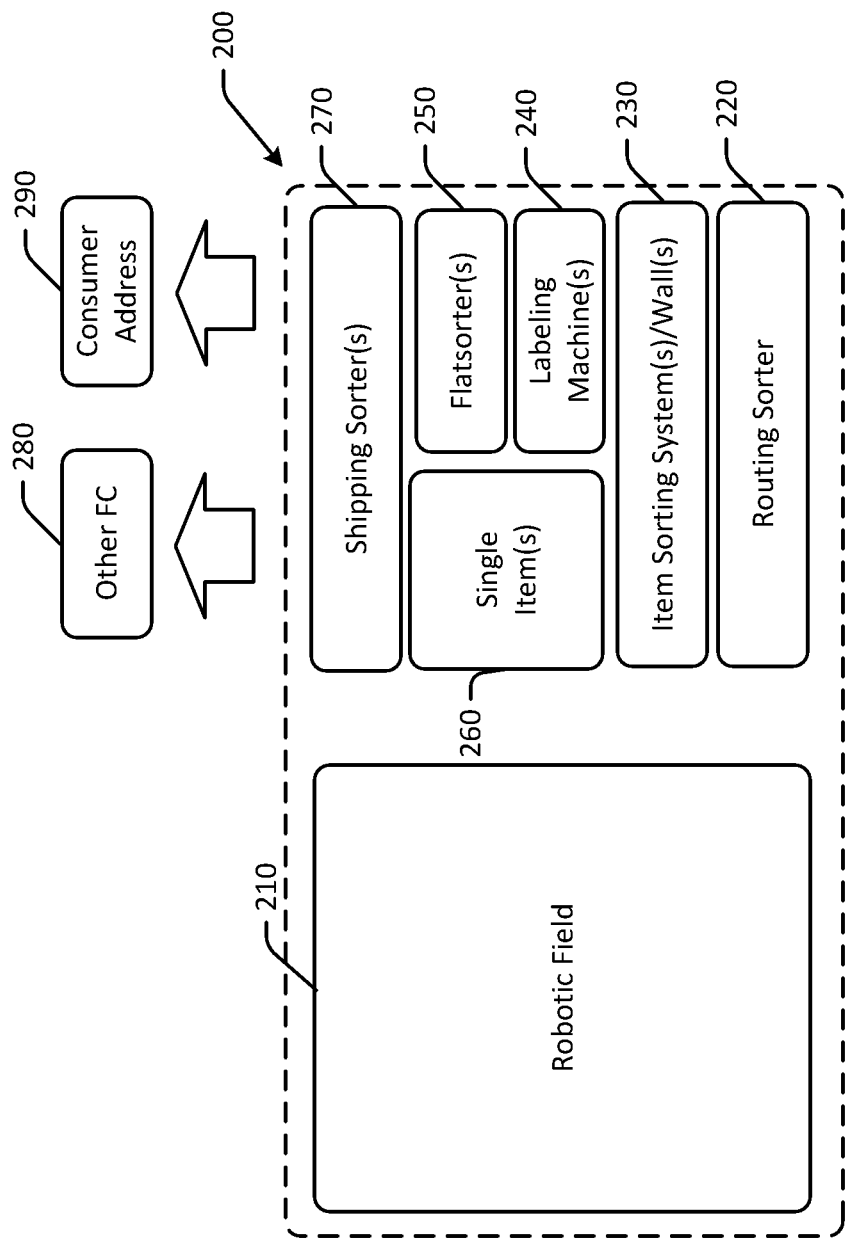
FIG. 2 is a hybrid schematic illustration of an example use case for stabilization of autonomous vehicles using electromagnetic force in accordance with one or more embodiments of the disclosure.

FIG. 2 is a hybrid schematic illustration of an example use case for stabilization of autonomous vehicles using electromagnetic force in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking, one or more routing sorters 220 that may be used to direct totes or other containers to item sorting systems, one or more item sorting systems or walls 230 used to consolidate products for multi-item orders and/or to pack multi-item orders, one or more single item sections 260 that may be used to pack single item orders, one or more labeling machines 240 that may be used to apply shipping labels to packages, one or more flat sorters 250 and shipping sorters 270 to sort labeled shipments (e.g., by destination, carrier, etc.) for pickup from the fulfillment center 200.

In some embodiments, the item sorting systems described herein may be a part of the flat sorters 250, where the item sorting systems may be configured to sort packages into containers or chutes. In such embodiments, the item sorting systems may or may not also be used at the item sorting systems 230 portion of the fulfillment center 200. Accordingly, the item sorting systems may be disposed at, or otherwise coupled to, a cross belt conveyor system, such as the flat sorters 250 of the fulfillment center 200.

The item sorting system machines 230 may include containers and/or containers of different sizes (e.g., small, medium, large, etc.) and may be configured, in one example, to handle items that weigh up to twenty or more pounds (e.g., 100 pounds or more, etc.). In some embodiments, the item sorting system machines 230 may include multiple chutes, such as about 328 chutes, and may be configured to sort items at a rate of about 2,100 units per hour or more. In some instances, the item sorting system machines 230 may have two inductors (e.g., one on each side, etc.), and may be modular. For example, the item sorting system machines 230 may each include sixteen expansion modules, where expansion modules may be defined as three two-sided columns next to one another for a total length of about 80 feet. The item sorting system machines 230 may reduce labor and capital costs associated with processing orders.

In some embodiments, the item sorting system 230 may replace other processes, such as manual processes. For example, manual induction of products from a tote to a sorter machine may be a bottleneck that is avoided by the systems and methods described herein. The item sorting system 230 may be a cross-belt shuttle sorter that sorts singulated products into containers or totes. Item sorting systems 230 may be capable of sorting at a rate of 2,100 units per hour or more. Certain item sorting systems 230 may be configured to handle items of up to twenty pounds, or more in some instances, with dimensions of about 18"× 14"×8" or greater, which may cover almost all products at the fulfillment center 200. The item sorting systems 230 may operate as a high-speed, high-destination sort solution that intakes items or packages and sorts them into containers using a shuttle that travels vertically and horizontally inside the machine (or outside in some instances).

Individual item sorting system machines may be item sorting systems, and may include a number of, such as two or more, modular sorting machines coupled in series, or otherwise adjacent to each other and connected. The modular sorting machines may include a first modular sorting machine. The modular sorting machines may be configured to singulate items from a tote comprising a plurality of items into a plurality of chutes or containers (e.g. induct individual items from a container that has multiple items, and place the inducted items into the appropriate chute to be routed to a container, where chutes or containers are associated with multi-item orders). The tote from which items are inducted may be associated with the individual item sorting system machine (e.g., the modular sorting machines that form the individual item sorting system machine, etc.). In some embodiments, item sorting systems or individual item sorting machines may be configured to induct and sort packages based at least in part on a destination of the respective packages. Destinations may be internal destinations within a fulfillment center, external destinations to geographic regions or addresses, or other destination types. For example, output from the fulfillment center 200 may include containers of items routed to other fulfillment centers 280, packages addressed to consumer addresses 290, and so forth.

Accordingly, in some embodiments, at any stage along the process, one or more stacks of containers may be transported from one location to another via the use of autonomous vehicles, such as autonomous robots. In some embodiments, at various pick up and drop off locations for the stacks of containers, electromagnetic force may be used to stabilize the vehicles during loading and/or unloading of containers from the vehicle.

Embodiments of the disclosure include stabilization of autonomous vehicles using electromagnetic force. The systems and methods described herein may include automated use of electromagnetic force to stabilize vehicles during loading or unloading of payloads, such as stacks of one or more containers. As a result, structural components such as pallets and other materials may not be needed, and efficiency of processing and loading/unloading containers may be improved. Certain embodiments may improve processing speed and/or throughput of fulfillment centers. Certain embodiments may improve performance of mechanical equipment for sortation and/or consolidation of items for multi-item orders. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 3:
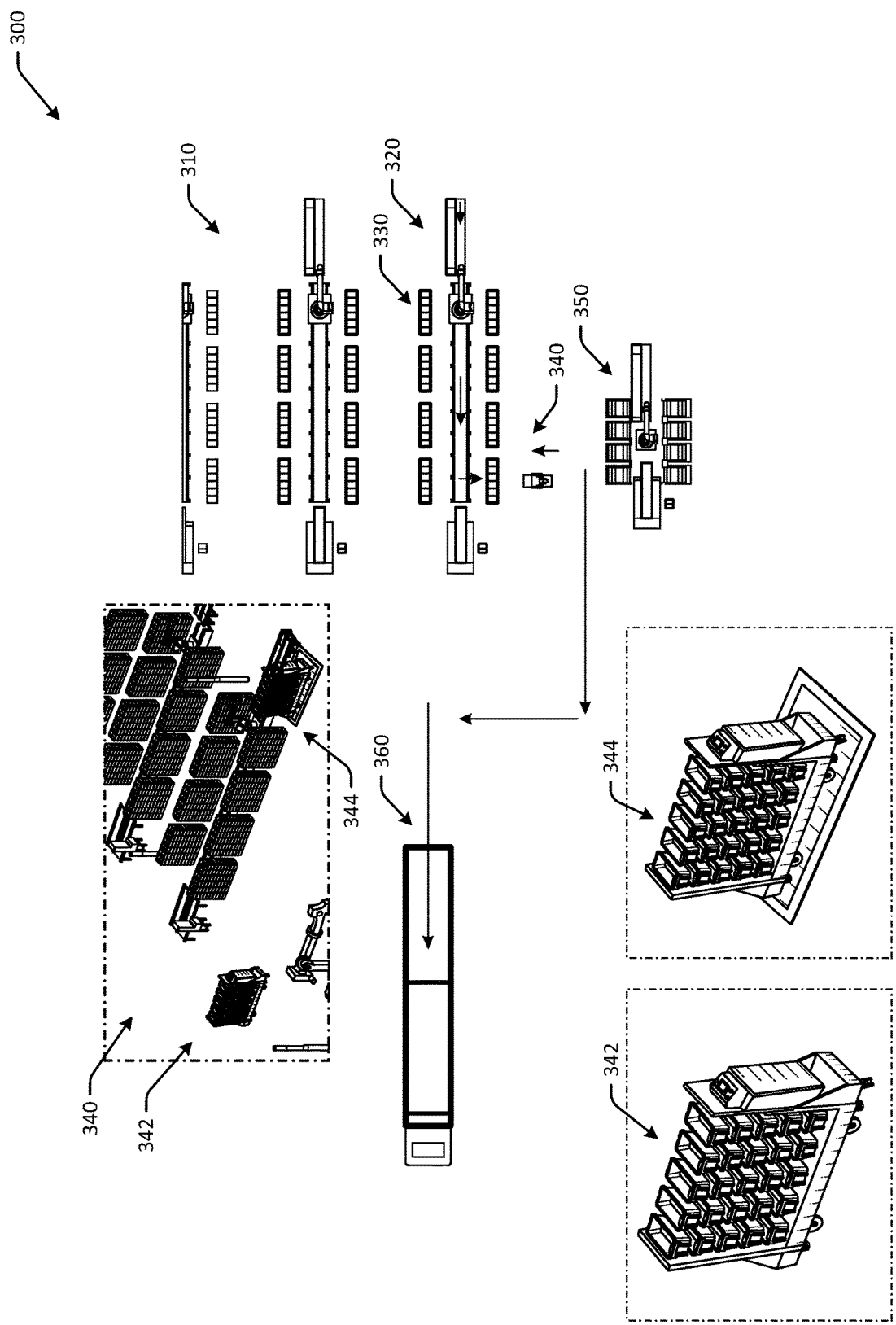
FIG. 3 is a schematic illustration of a fulfillment center and an example use case for stabilization of autonomous vehicles using electromagnetic force in accordance with one or more embodiments of the disclosure.

FIG. 3 is a schematic illustration of a fulfillment center and an example use case for stabilization of autonomous vehicles using electromagnetic force in accordance with one or more embodiments of the disclosure. Other embodiments may include additional or fewer components. The illustration of FIG. 3 is not to scale, and may not be illustrated to scale with respect to other figures. The system illustrated in FIG. 3 may be the same system(s) discussed with respect to FIGS. 1-2.

In FIG. 3, a system for electromagnetic stabilization of autonomous vehicles is depicted in an overhead schematic view. At a first location 310, containers to be loaded into a trailer may be moved to a loading area via one or more conveyors 320. The containers may be moved to and/or from the first location 310 in a number of stacks by one or more autonomous vehicles. For example, stacks of containers may be formed into one or more walls or arrays of containers 330. The containers may be stacked by a robotic manipulator, such as a robotic arm or a tote stacker system, and may be loaded onto autonomous vehicles for transport. The container stacking process may be in any suitable format, such as stacking on both sides of the conveyors 320, and may include stacking containers from more than one conveyor, as illustrated in detail view 350.

A vehicle 340, such as an autonomous vehicle or a manually operated vehicle, may include one or more electromagnets that may be used to couple to a steel plate via electromagnetic force, where the steel plate is mounted to a floor of the facility. The electromagnetic force may be used to stabilize the vehicle during loading and/or unloading of containers. The vehicle may therefore transport one or more stacks of containers in the array of containers 330 from the first location 310 to another location, such as a trailer 360, for loading or unloaded.

As illustrated in detail view 342, the autonomous vehicle 340 may be used to transport one or more stacks of containers throughout the facility. In detail view 344, the vehicle 340 is depicted positioned on top of a steel plate, which may be used in conjunction with one or more electromagnets coupled to the vehicle 340 to stabilize the vehicle 340. The steel plate may be any metal plate and may be non-magnetic in some embodiments. The steel plate may be used to generate the electromagnetic force used to stabilize the vehicle 340. The steel plate(s) may be positioned at locations throughout the facility where containers may be loaded onto or off of vehicles, and may provide a minimal footprint. In some embodiments, more than one strip of metal may be used instead of a metal plate. The vehicle 340 may secure and optionally transport the array of containers 330 into the trailer 360 or to another location.

The system for automated loading of the trailer may therefore include one or more robotic arms configured to stack containers into an array formation at a container stacking station, such as the first location 310. The system may optionally include an autonomous vehicle, such as the vehicle 340. The system may include one or more electromagnets coupled to the vehicle that can generate an electromagnetic force to stabilize the vehicle, such that the vehicle 340 is not destabilized while loaded or unloading stacks of containers.

Figure 4:
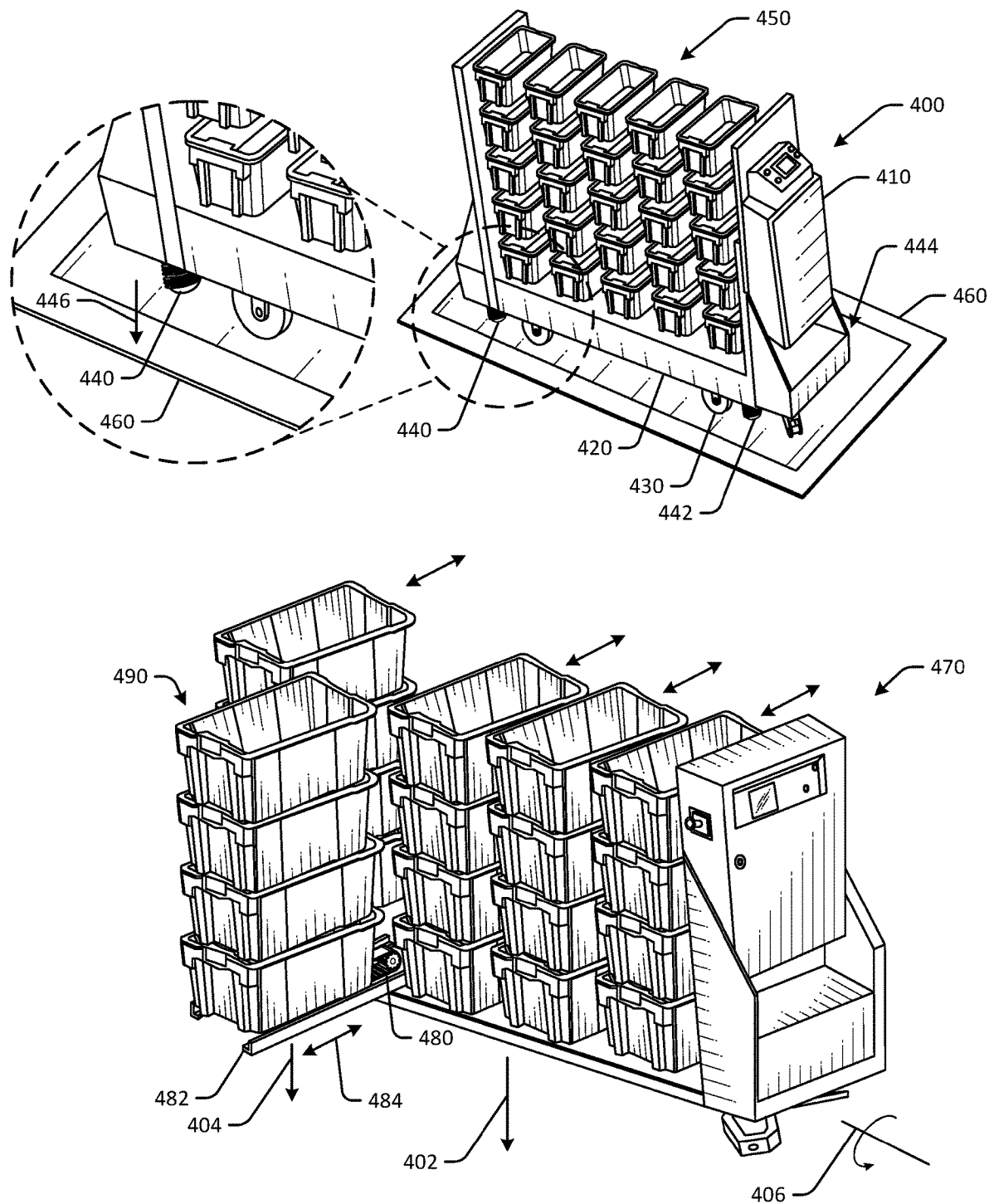
FIG. 4 is a schematic illustration of an example electromagnetic stabilization system in accordance with one or more embodiments of the disclosure.

FIG. 4 is a schematic illustration of an example electromagnetic stabilization system in accordance with one or more embodiments of the disclosure. Other embodiments may include additional or fewer components. The illustration of FIG. 4 may not be to scale, and may not be illustrated to scale with respect to other figures. The electromagnetic stabilization system illustrated in FIG. 4 may be the same electromagnetic stabilization system discussed with respect to FIGS. 1-3.

In FIG. 4, an electromagnetic stabilization system may include an autonomous vehicle 400 and one or more metal plates 460. The autonomous vehicle 400 may include one or more electromagnets that may be configured to generate an electromagnetic force in conjunction with the steel plate 460. The electromagnetic force may be used to stabilize the autonomous vehicle 400 during loading or unloading of payload, and/or while the autonomous vehicle 400 is in motion. In some embodiments, the steel plate 460 may be formed of metal, alloy, or another suitable material(s), and may be non-magnetic in some instances. The steel plate 460 may be coupled to the floor using screws, bolts, adhesive, and/or a different type of fastener or attachment.

The autonomous vehicle 400 may include a base 420. The base 420 may be configured to support one or more containers 450. For example, the base 420 may be configured to support multiple stacks of one or more containers. In the illustrated embodiment, the autonomous vehicle 400 may be configured to support five stacks of five containers onboard the autonomous vehicle 400. In other embodiments, a different number of containers may be supported, and may vary based on size of the containers, size of the autonomous vehicle 400, and so forth. The base 420 may include a first side and a second side. The first side may be along a first lateral side of the autonomous vehicle 400, and the second side may be opposite the first side. The containers 450 may be loaded or unloaded from one or both sides of the autonomous vehicle 400. The autonomous vehicle 400 may include one or more wheels 430 that may be used to move about an environment. The autonomous vehicle 400 may be configured to move autonomously, in that the autonomous vehicle 400 may navigate through an environment using preplanned routes (e.g., received from a computer system, etc.) or dynamically generated routes using one or more sensors. The autonomous vehicle 400 may therefore include one or more computer systems or controllers 410 to control operations of the autonomous vehicle 400, such as navigation of the autonomous vehicle 400, loading and/or unloading of containers, engagement of electromagnets, and/or other operations.

The autonomous vehicle 400 may include one or more container handling assemblies that may be used to handle containers. For example, the container handling assemblies may be configured to move container stacks, load container stacks onto the autonomous vehicle 400, unload container stacks from the autonomous vehicle 400, and/or other operations. The container handling assemblies may include one or more extendable rails, motors or other drive components (e.g., servos, actuators, etc.), and/or container grasping mechanisms that are configured to push, pull, lift, release, and/or support stacks of one or more containers. For example, individual container handling mechanisms may be configured to extend over the first side and/or the second side of the base 420 of the autonomous vehicle 400, so as to retrieve container stacks to load onto the autonomous vehicle 400, and/or to place container stacks onto a destination location.

In the illustrated embodiment, five container handling assemblies may be included, where individual container handling assemblies are configured to handle individual container stacks. Other embodiments may include a different number of container handling assemblies, and individual container handling assemblies may handle more than one container stack in other embodiments. For example, as depicted in isolated perspective view 470 the autonomous vehicle 400 may include a first container handling assembly 480 coupled to the base 420. The first container handling assembly 480 may be configured to support a first stack of containers 490. The first container handling assembly 480 may be configured to extend from the autonomous vehicle 400 in a first direction over the first side of the base 420, as well as in a second direction over the second side of the base 420. In other embodiments, the first container handling assembly 480 may be configured to extend in a single direction. The first container handling assembly 480 may include one or more rails 482 that support the first stack of containers 490 as the stack is extended. Any of the container handling assemblies may be configured to move in one or more directions 484.

The autonomous vehicle 400 may have a center of mass 402. The center of mass 402 may remain relatively unchanged even when the autonomous vehicle 400 is fully loaded with a payload. However, as the first stack of containers 490 is extended away from the base 420 of the autonomous vehicle 400, depending on the weight of the first stack of containers 490 and the distance the first container handling assembly 480 is extended, the center of mass may be displaced to a new location 404, which may create a tipping torque or otherwise potentially destabilize the autonomous vehicle 400. The tipping torque is depicted as an arrow about a longitudinal axis 406 of the autonomous vehicle 400.

In one example, individual containers may weigh 50 pounds, and a stack of containers may therefore weigh 250 pounds. The container stacks may be moved up to three feet off of the base 420 of the autonomous vehicle 400, which can potentially destabilize the autonomous vehicle 400 and cause the vehicle to tilt towards the direction of the containers. This may occur during loading or unloading of the stack of containers. In addition, in instances where more than one stack of containers is loaded or unloaded at the same time, the issue may be more problematic.

To overcome the potential destabilization of the autonomous vehicle 400, and to reduce the impact of the tipping torque, the autonomous vehicle 400 may include one or more electromagnets. The electromagnets may be energized so as to create an electromagnetic force between the electromagnets and the steel plate 460. For example, the autonomous vehicle 400 may include a first electromagnet 440 coupled to the base 420 along the second side of the base 420. In some embodiments, the autonomous vehicle 400 may include a second electromagnet 442 coupled to the base 420 along the second side of the base 420. The autonomous vehicle 400 may include a third electromagnet 444 and a fourth electromagnet coupled to the base 420 along the first side of the base 420. Any number of electromagnets may be included and positioned at different locations under the base 420. The electromagnets may have the same or a different number of coils, which may differ for the various applications of the autonomous vehicle 400.

The controller 410 of the autonomous vehicle 400 may be configured to energize the first electromagnet 440 when the first container handling assembly 480 is in an extended position, such that the autonomous vehicle is stabilized via an electromagnetic force 446 generated by the first electromagnet 440. The autonomous vehicle 400 may include one or more batteries coupled to the first electromagnet 440 so as to provide current to energize the first electromagnet 440.

In some embodiments, the controller 410 may determine one or more specific electromagnets to energize. For example, depending on the direction of extension of one or more container handling assemblies, one or more electromagnets on the opposite side of the base may be energized, which may avoid energizing of all of the electromagnets. Such approaches may reduce battery consumption and/or extend time between battery charging for the autonomous vehicle 400. For example, if the first container handling assembly 490 is extended as illustrated in FIG. 4, the third electromagnet 444 and the fourth electromagnet may be energized, whereas if a container handling assembly were extended in the opposite direction, the first electromagnet 440 and the second electromagnet 442 may be energized. In other embodiments, all of the electromagnets may be energized to provide maximum stability for the autonomous vehicle 400. In some embodiments, the amount of current provided to one or more of the electromagnets may be changed based at least in part on a predicted shift in center of mass, so as to adjust a magnitude of the electromagnetic force generated by the electromagnet(s). The electromagnetic force generated by the energized electromagnet(s) may cause the autonomous vehicle 400 to be stabilized.

Although referred to with numerical descriptors of "first," "second," "third," and "fourth" electromagnet in the discussion of FIG. 4, the electromagnets may be arranged in any suitable order, and the numerical descriptors may not necessarily correspond to any numerical descriptors of the electromagnets recited in the claims.

Figure 5:
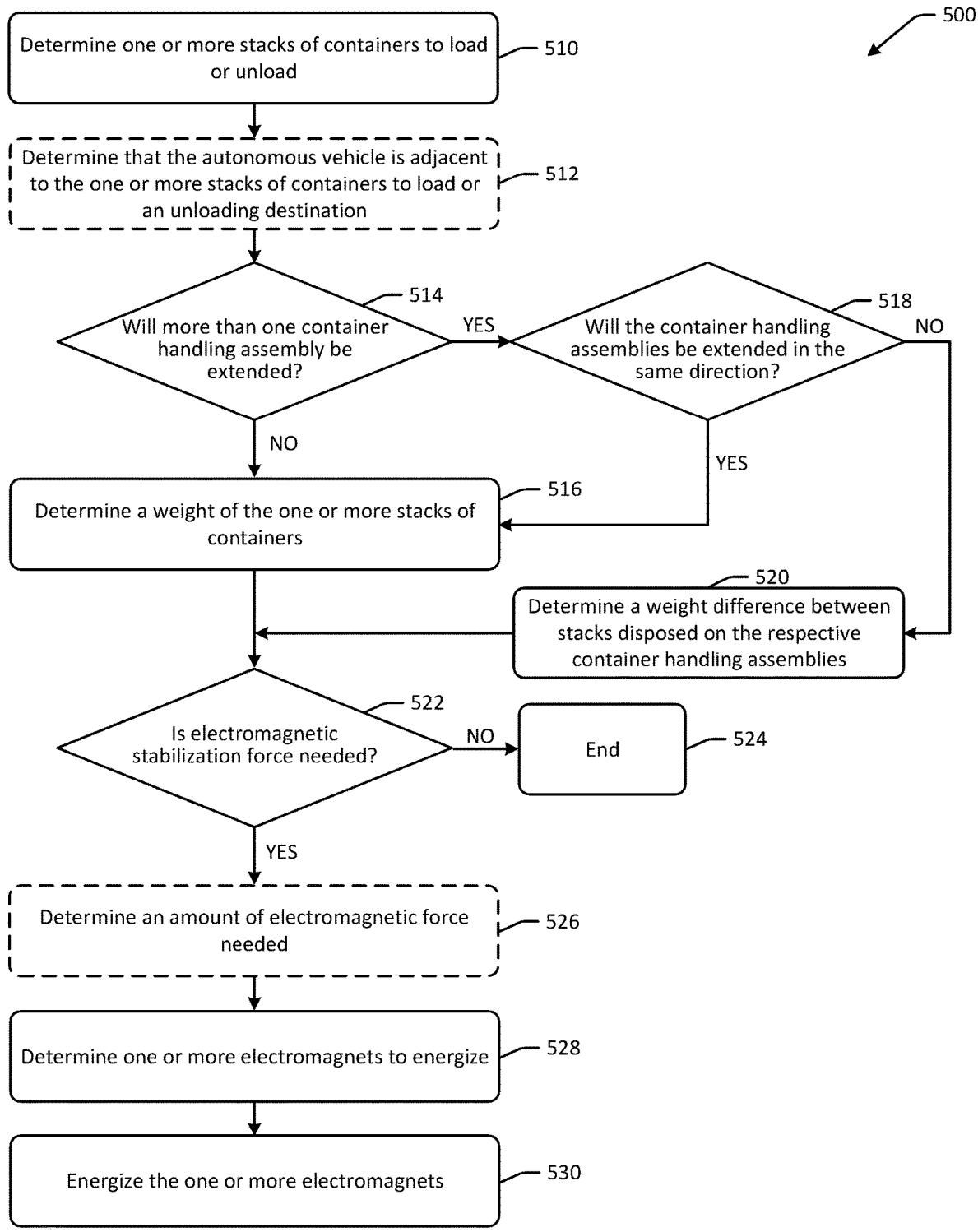
FIG. 5 is a schematic illustration of an example process flow for stabilization of autonomous vehicles using electromagnetic force in accordance with one or more embodiments of the disclosure.

FIG. 5 is a schematic illustration of an example process flow 500 for stabilization of autonomous vehicles using electromagnetic force in accordance with one or more embodiments of the disclosure. Other embodiments may include additional or fewer operations. The operations of FIG. 5 may be performed in any order and some of the operations may be performed at least partially concurrently.

At block 510, one or more stacks of containers to load or unload may be determined. For example, an autonomous vehicle controller or other associated computer system may be configured to determine one or more stacks of containers that are to be loaded onto, or unloaded off of, the autonomous vehicle. To determine the one or more stacks of containers, in some embodiments, the autonomous vehicle may receive instructions from another computer system. For example, the autonomous vehicle may be instructed to retrieve a stack of containers from a first location, and to transport the stack of containers to a second location. The autonomous vehicle may approach the first location, and may optionally identify the stack of containers using or more sensors, such as cameras, Lidar, NFC, RFID, or other sensors. The autonomous vehicle may determine that the stack of containers is to be loaded onto a certain container handling assembly of the autonomous vehicle. Such determinations may be made based at least in part on a weight of other stacks of containers on the autonomous vehicle, a number of available or unfilled container handling assemblies of the autonomous vehicle, and/or other factors. Weight data for stacks of containers or individual containers may be determined via communication with one or more remote servers.

At optional block 520, it may be determined that the autonomous vehicle is adjacent to the one or more stacks of containers to load or adjacent to an unloading destination. For example, the autonomous vehicle may optionally determine that the autonomous vehicle has arrived at a particular destination, whether to load or unload containers, based at least in part on feedback from one or more sensors. The autonomous vehicle may position itself such that the containers can be grasped using a desired container handling assembly.

At determination block 514, a determination may be made as to whether more than one container handling assembly will be extended. For example, in some embodiments, more than one stack of containers may be loaded at the same time, or at least partially at the same time, or more than one stack of containers may be unloaded at the same time, or at least partially at the same time. In such instances, more than one container handling assembly may be extended at the same time, or at least partially at the same time. In addition, in some instances, one container stack may loaded at the same time that another container stack is unloaded, and there may therefore be more than one container handling assembly extended. As a result, in such instances, the determination at determination block 514 may be positive. The controller may determine whether more than one container handling assembly will be extended at a certain location, and may therefore determine whether the determination at block 514 is positive or negative.

If it is determined at block 514 that more than one container handling assembly will not be extended, the process flow 500 may proceed to block 516. At block 516, a weight of the one or more stacks of containers may be determined. For example, the controller of the autonomous vehicle may request data associated with the stack of containers from one or more remote servers. In some embodiments, the weights of individual containers may be determined and added to determine a weight of the stack of containers. For container stacks that are loaded onto the autonomous vehicle, the weight of the containers may be determined or measured using one or more sensors, such as a load cell, strain gauge, or other sensor. In some embodiments, the controller may be configured to determine that a first container handling assembly and a second container handling assembly are extended, or will be extended, in a first direction, and may determine a first weight of the first stack of containers and a second weight of the second stack of containers. The controller may dynamically adjust the electromagnetic force generated by the first electromagnet based at least in part on the first weight and the second weight. The process flow 500 may proceed to determination block 522.

If it is determined at block 514 that more than one container handling assembly will be extended, the process flow 500 may proceed to determination block 518. At determination block 518, a determination may be made as to whether the container handling assemblies will be extended in the same direction. For example, the autonomous vehicle may load or unload container stacks to either side of the autonomous vehicle. If the container stacks are to be loaded from the same side, or unloaded to the same side, the determination at determination block 518 may be negative. If the container stacks are to be loaded from opposite sides or unloaded to opposite sides, the determination at determination block 518 may be positive. If it is determined at determination block 518 that the container handling assemblies will be extended in the same direction, the process flow 500 may proceed to block 516, and the weight of the container stacks may be determined. This may indicate that a large tipping moment is to be expected.

If it is determined at determination block 518 that the container handling assemblies will not be extended in the same direction, the process flow 500 may proceed to block 520. This may indicate that a tipping moment generated by one of the container stacks may be at least partially offset by the container stack that is extended in the opposite direction.

At block 520, a weight difference between the stacks disposed on the respective container handling assemblies, or to be retrieved by the respective container handling assemblies, may be determined. For example, because the tipping moments generated by the respective container stacks may cancel each other out at least partially, a difference in weight may be determined in order to determine on which side a tipping moment will be generated. For example, if one stack of containers is significantly heavier than the other, there may be a significant tipping moment that is generated and not offset by the opposing container stack. The controller of the autonomous vehicle may determine the difference in respective weights of the container stacks. In some embodiments, the controller may be configured to determine that a first container handling assembly is extended, or will be extended, in the first direction, and may determine that the second container handling assembly is extended, or will be extended, in the second direction. The controller may determine a difference between a first weight of the first stack of containers and a second weight of the second stack of containers, and may dynamically adjust the electromagnetic force generated by the first electromagnet based at least in part on the difference. The process flow 500 may proceed to determination block 522.

At determination block 522, a determination may be made as to whether electromagnetic stabilization force is needed. For example, the autonomous vehicle may implement one or more thresholds that can be used to determine whether electromagnetic stabilization force. For example, if an expected tipping moment generated by the one or more container stacks is below the threshold, then electromagnetic stabilization force may not be needed. However, if the expected tipping moment is greater than the threshold, then electromagnetic stabilization force may be needed. The threshold may be determined based at least in part on a mass of the autonomous vehicle, whether the autonomous vehicle has any payloads other than the container stack(s) that are to be loaded or unloaded, a mass of the any loaded container stacks, and/or other factors. In some embodiments, the controller may determine that a weight of the first stack of containers is greater than a threshold prior to energizing an electromagnet. In some embodiments, the controller may determine that a weight of the first stack of containers is greater than a threshold prior to energizing an electromagnet. In some embodiments, the controller may be configured to determine a total weight of the autonomous vehicle (e.g., including its payload, etc.) and determine the threshold based at least in part on the total weight. To determine the total weight, the autonomous vehicle may interrogate one or more sensors, such as load cells, to determine a current weight of payload loaded onto the autonomous vehicle. For example, the controller may determine feedback from one or more sensors to calculate a total payload weight. If it is determined at determination block 522 that electromagnetic stabilization force is not needed, the process flow 500 may end at block 524, and the autonomous vehicle may continue with loading or unloading the container stacks.

If it is determined at determination block 522 that electromagnetic stabilization force is needed, the process flow 500 may proceed to optional block 526, at which an amount of electromagnetic stabilization force may be determined. For example, the autonomous vehicle may determine an expected tipping moment, and may determine an amount of electromagnetic stabilization force needed to counteract or otherwise offset the tipping moment. In some embodiments, the amount of electromagnetic stabilization force generated may be modified by managing an amount of current provided to electromagnets and/or using current schemes such as pulse width modulation. In some embodiments, the controller may be configured to determine a weight of the first stack of containers, and may dynamically adjust the electromagnetic force generated by the first electromagnet based at least in part on the weight.

At block 528, one or more electromagnets to energize may be determined. For example, the autonomous vehicle may determine the electromagnets positioned to generate the opposing tipping moment. In some instances, the electromagnets disposed on a side of the autonomous vehicle opposite the side the container handling assembly will extend may be selected. In some embodiments, if the expected tipping moment is greater than a certain threshold, all electromagnets may be selected so as to provide maximum stability. Selecting less than all of the electromagnets may allow for reduced battery consumption.

At block 530, the selected one or more electromagnets may be energized. For example, the electromagnets may be energized using a battery of the autonomous vehicle, and may generate an electromagnetic force to offset the tipping moment generated by the stacks of containers. The container handling assemblies may then be extended. Accordingly, the process flow 500 may be used to provide electromagnetic force that stabilizes the autonomous vehicle during loading and unloading of containers.

Figure 6:
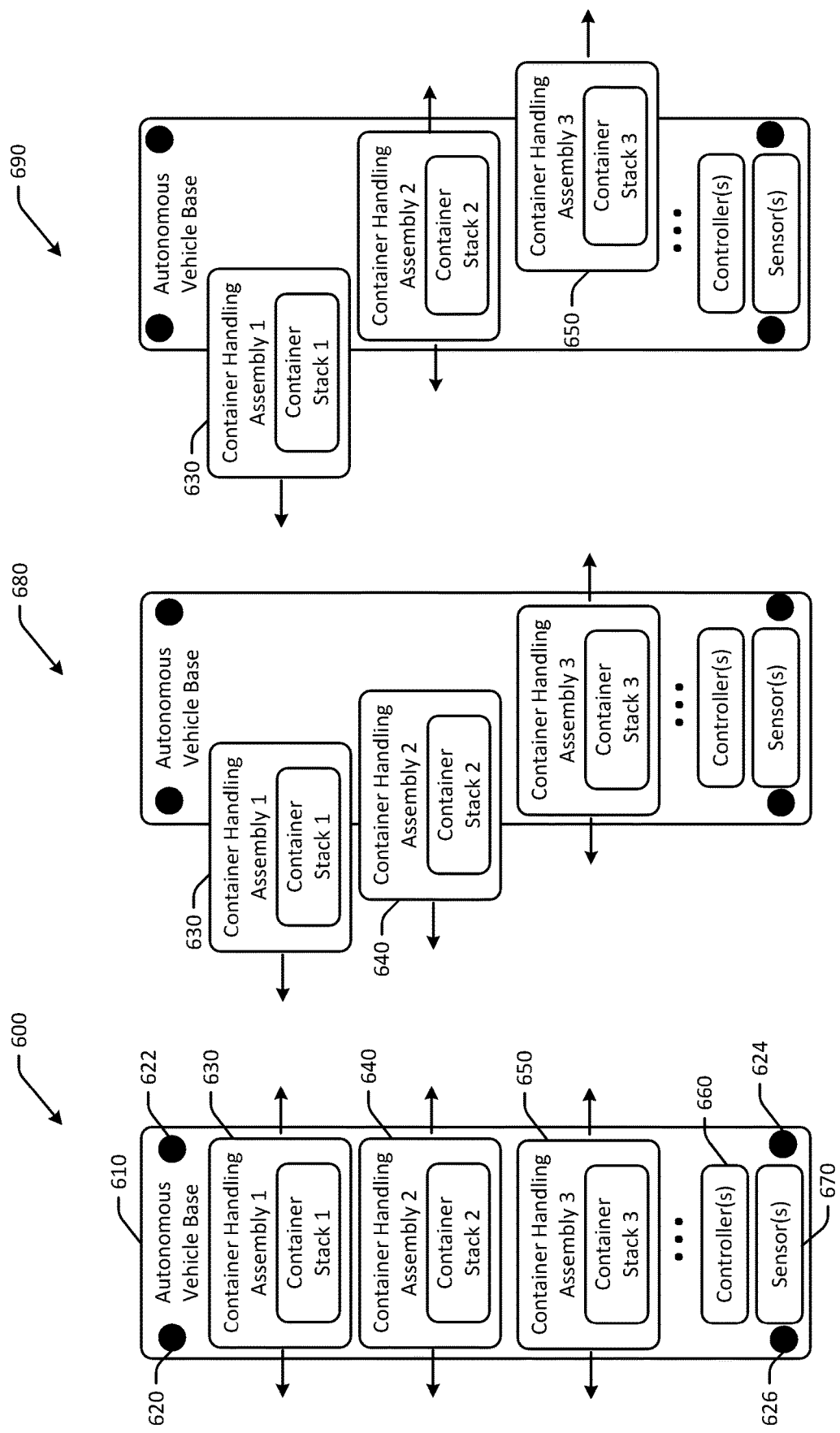
FIG. 6 is a schematic illustration of a top view of an example autonomous vehicle with electromagnetic force stabilization in accordance with one or more embodiments of the disclosure.

FIG. 6 is a schematic illustration of a top view of an example autonomous vehicle with electromagnetic force stabilization in accordance with one or more embodiments of the disclosure. Other embodiments may include additional or fewer components. The illustration of FIG. 6 may not be to scale, and may not be illustrated to scale with respect to other figures. The autonomous vehicle illustrated in FIG. 6 may be the same autonomous vehicle discussed with respect to FIGS. 1-5.

In FIG. 6, a number of different instances of use for an autonomous vehicle are depicted in accordance with various embodiments. For example, at a first instance 610, an autonomous vehicle may have an autonomous vehicle base 610. A number of electromagnets may be coupled to the base 610. For example, a first electromagnet 620 may be coupled to the base 610 along a first side, a second electromagnet 622 may be coupled to the base 610 along a second side, a third electromagnet 624 may be coupled to the base 610 along the second side, and a fourth electromagnet 626 may be coupled to the base 610 along the first side. Any number of electromagnets may be used. In addition, various form factors and orientations of electromagnets may be used. The autonomous vehicle may include one or more controllers 660 and one or more sensors 670, such as load sensors, Lidar sensors, weight sensors, cameras, and/or other sensors.

The autonomous vehicle may include a number of container handling assemblies, such as a first container handling assembly 630, a second container handling assembly 640, a third container handling assembly 650, and so forth. Any number of container handling assemblies may be included. In some embodiments, individual container handling assemblies may be configured to support one or more container stacks. For example, the first container handling assembly 630 may support a first container stack, the second container handling assembly 640 may support a second container stack, the third container handling assembly 650 may support a third container stack, and so forth.

The container handling assemblies may be configured to slide or extend from the base 610 in one or more directions, such as the directions illustrated by arrows in FIG. 6. As a result, the container handling assemblies may be configured to load or unload containers from one or both sides of the autonomous vehicle.

During loading and/or unloading of container stacks, depending on which container handling assemblies are to be actuated and in which directions, different electromagnets may be energized. For example, at the first instance 600, none of the electromagnets may be energized because the container handling assemblies are positioned along the longitudinal axis of the autonomous vehicle.

However, at a second instance 680, the first container handling assembly 630 and the second container handling assembly 640 may be extended in the same direction at least partially at the same time. Depending on the weight of the first container stack and the second container stack, a tipping moment may be generated as a result of the extension, which may destabilize the autonomous vehicle. To counteract the tipping moment, the second electromagnet 622 and the third electromagnet 624 may be energized. In some embodiments, all of the electromagnets may be energized.

At a third instance 690, the first container handling assembly 630 may be extended in a first direction, while the third container handling assembly 650 is extended in a second direction opposite the first direction at least partially at the same time. In this instance, tipping moments generated by the first container stack and the third container stack may at least partially offset each other, so electromagnet use may not be necessary. If there is still an expected tipping moment that is greater than a threshold, electromagnets at a side opposite the tipping moment may be energized to stabilize the autonomous vehicle.

For example, the controller of the autonomous vehicle may be configured to energize the first electromagnet 620 and the fourth electromagnet 626 when the first container handling assembly is in an extended position in the second direction, and energize the second electromagnet 622 and the third electromagnet 624 when the first container handling assembly is in an extended position in the first direction. First and second directions are not absolute values.

The controller may therefore, in some embodiments, determine that a first stack of containers is loaded onto a first container handling assembly of the autonomous vehicle, where the first container handling assembly is configured to extend from the autonomous vehicle in a first direction and a second direction. The controller may determine that a second stack of containers is loaded onto a second container handling assembly of the autonomous vehicle, where the second container handling assembly is configured to extend in the first direction and the second direction. The controller may energize a first electromagnet when the first container handling assembly is in an extended position in the second direction (e.g., to the right of the page in the example of FIG. 6), such that the autonomous vehicle is stabilized via an electromagnetic force generated by the first electromagnet.

Figure 7:
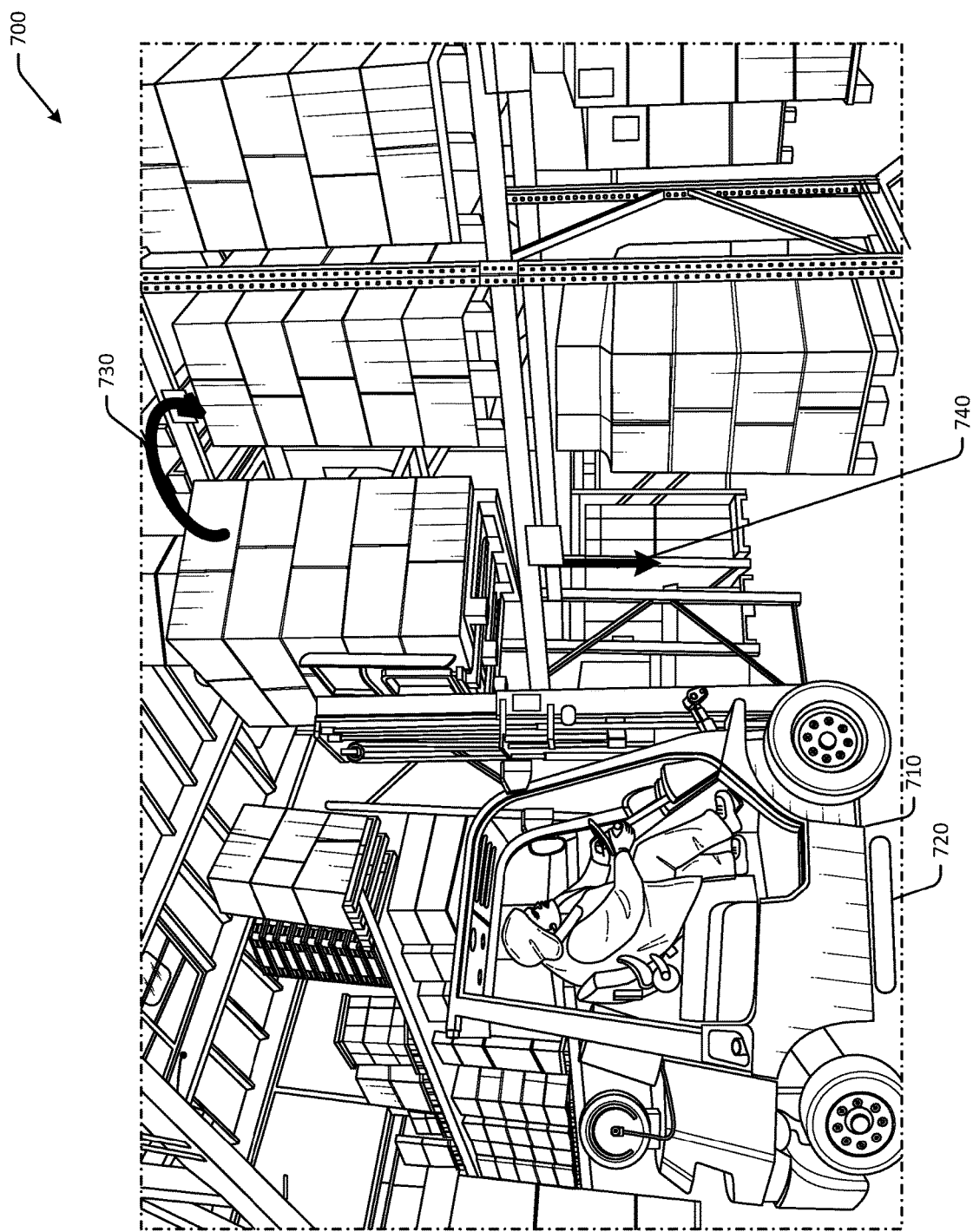
FIG. 7 is a schematic illustration of an example electromagnetic stabilization system for use with a vehicle in accordance with one or more embodiments of the disclosure.

FIG. 7 is a schematic illustration of an example electromagnetic stabilization system 700 for use with a vehicle in accordance with one or more embodiments of the disclosure. Other embodiments may include additional or fewer components. The illustrations of FIG. 7 may not be to scale, and may not be illustrated to scale with respect to other figures. The electromagnetic stabilization system illustrated in FIG. 7 may be the same electromagnetic stabilization system discussed with respect to FIGS. 1-6.

In FIG. 7, the electromagnetic stabilization system 700 may be used with manually operated, or non-autonomous vehicles, such as a forklift 710. The forklift 710 may include one or more electromagnets coupled to a base of the forklift 710, which may be used to engage with a metal plate 720 on a floor of a facility to generate an electromagnetic force that stabilizes the forklift 710. For example, the forklift 710 may include a heavy payload, such as a pallet of materials, that are elevated to a relatively high height. As the payload is elevated, a tipping moment 730 may be generated that may cause the forklift 710 to destabilize due to a mass 740 of the payload. However, the tipping moment 730 may be counterbalanced or offset by the electromagnetic force generated by the electromagnets.

As a result, the electromagnetic stabilization system 700 may be used in conjunction with vehicles that are already deployed in facility environments, and may provide a solution that can be retrofit to existing vehicles with enhanced stability, reduced risk of vehicle destabilization, and the ability to transport or otherwise handle larger sizes and/or volumes of payload.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
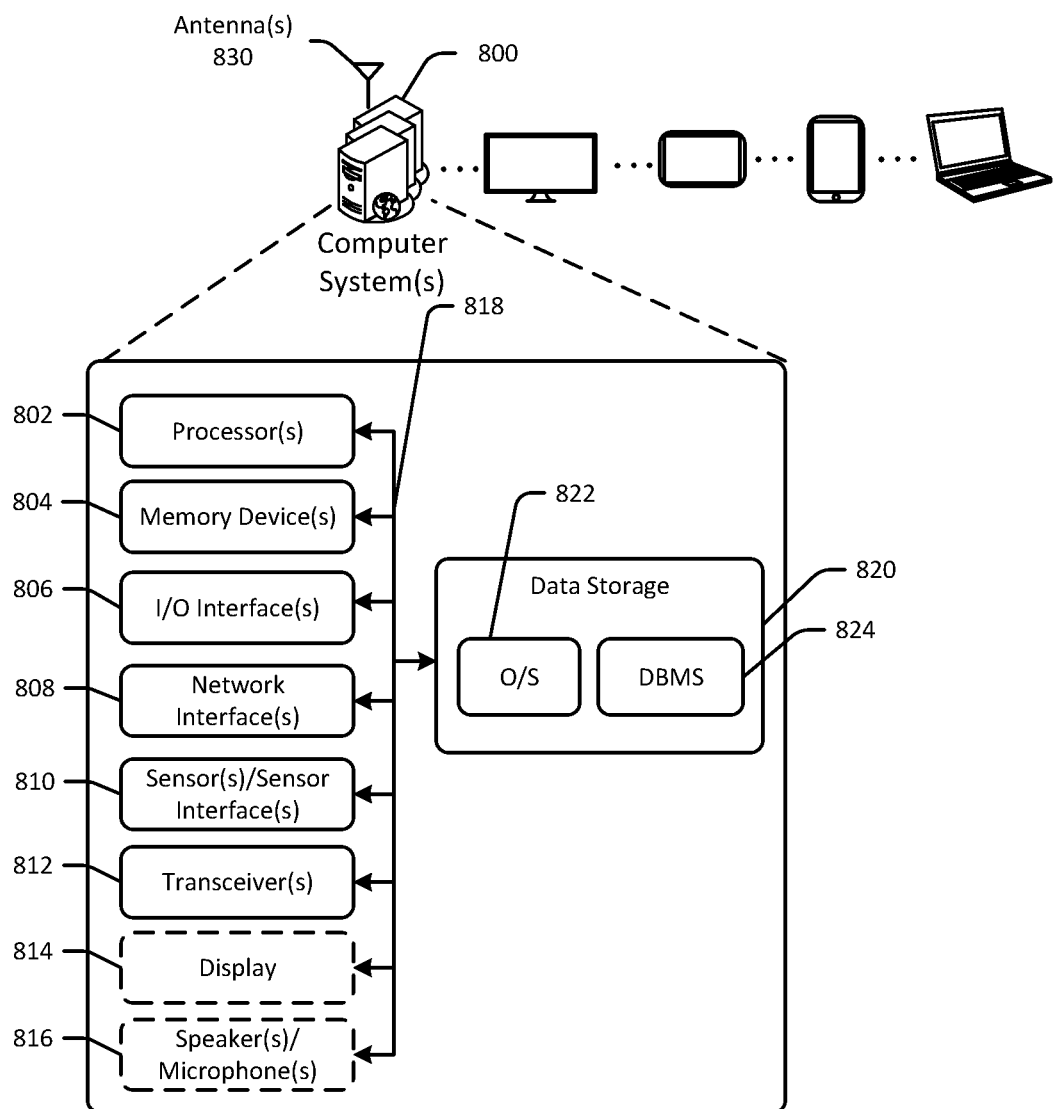
FIG. 8 schematically illustrates an example architecture of a computer system associated with an autonomous vehicle in accordance with one or more embodiments of the disclosure.

FIG. 8 is a schematic block diagram of one or more illustrative computer system(s) 800 associated with an autonomous vehicle in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for a computer system used in conjunction with any one of the system(s) of FIGS. 1-7.

The computer system(s) 800 may be configured to communicate with one or more servers, user devices, or the like. The computer system(s) 800 may be configured to control one or more operations of an autonomous vehicle, control energizing and/or usage of electromagnets, cause the autonomous vehicle system(s) to stack containers, retrieve containers, transport walls of containers, determine container capacity, determining Lidar or other sensor measurements, and so forth.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna(s) 830. Non-limiting examples of suitable antennas may include directional antennas, non-directional antennas, dipole antennas, folded dipole antennas, patch antennas, multiple-input multiple-output (MIMO) antennas, or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 830—transmitting or receiving radio frequency (RF) signals in the bandwidth and/or channels corresponding to the communications protocols utilized by the computer system(s) 800 to communicate with other devices. The transceiver(s) 812 may include hardware, software, and/or firmware for modulating, transmitting, or receiving—potentially in cooperation with any of antenna(s) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computer system(s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system for electromagnetic stabilization of an autonomous vehicle, the system comprising:
    a steel plate coupled to a floor;
    the autonomous vehicle comprising:
        a base having a first side and a second side;
        a first container handling assembly coupled to the base, the first container handling assembly configured to support a first stack of containers, wherein the first container handling assembly is configured to extend from the autonomous vehicle in a first direction over the first side of the base, such that both the first container handling assembly and the first stack of containers are extended beyond the first side of the base, and a second direction over the second side of the base, such that both the first container handling assembly and the first stack of containers are extended beyond the second side of the base;
        a second container handling assembly coupled to the base, the second container handling assembly configured to support a second stack of containers, wherein the second container handling assembly is configured to extend from the autonomous vehicle in the first direction and the second direction;
        a first electromagnet coupled to the base along the second side;
        a second electromagnet coupled to the base along the first side; and
        a battery coupled to the first electromagnet and the second electromagnet; and
    a controller configured to energize the first electromagnet when the first container handling assembly is in an extended position in the first direction, such that the autonomous vehicle is stabilized via an electromagnetic force generated by the first electromagnet and wherein the controller is further configured to:
        determine that the first container handling assembly is extended in the first direction;
        determine that the second container handling assembly is extended in the second direction;
        determine a difference between a first weight of the first stack of containers and a second weight of the second stack of containers; and
        dynamically adjust the electromagnetic force generated by the first electromagnet based at least in part on the difference.

2. The system of claim 1, wherein the controller is further configured to energize the second electromagnet when the first container handling assembly is in an extended position in the second direction, such that the autonomous vehicle is stabilized via an electromagnetic force generated by the second electromagnet.

3. The system of claim 1, wherein the controller is further configured to:
  determine that the first container handling assembly and the second container handling assembly are extended in the first direction;
  determine a first weight of the first stack of containers;
  determine a second weight of the second stack of containers; and
  dynamically adjust the electromagnetic force generated by the first electromagnet based at least in part on the first weight and the second weight.

4. An autonomous vehicle comprising:
  a base comprising a first side and a second side;
  a first container handling assembly coupled to the base, the first container handling assembly configured to support a first stack of containers, wherein the first container handling assembly is configured to extend from the autonomous vehicle in a first direction over beyond the first side of the base;
  a first electromagnet coupled to the base along the second side; and
  a controller configured to energize the first electromagnet when the first container handling assembly is in an extended position beyond the first side of the base in the first direction, such that the autonomous vehicle is stabilized via an electromagnetic force generated by the first electromagnet.

5. The autonomous vehicle of claim 4, further comprising:
  a second electromagnet coupled to the base along the first side.

6. The autonomous vehicle of claim 5, wherein the first container handling assembly is further configured to extend from the autonomous vehicle in a second direction over the second side of the base; and
  wherein the controller is further configured to energize the second electromagnet when the first container handling assembly is in an extended position in the second direction, such that the autonomous vehicle is stabilized via an electromagnetic force generated by the second electromagnet.

7. The autonomous vehicle of claim 6, further comprising:
  a third electromagnet coupled to the base along the second side; and
  a fourth electromagnet coupled to the base along the first side;
  wherein the controller is further configured to:
    energize the first electromagnet and the third electromagnet when the first container handling assembly is in an extended position in the first direction; and
    energize the second electromagnet and the fourth electromagnet when the first container handling assembly is in an extended position in the second direction.

8. The autonomous vehicle of claim 6, further comprising:
  a second container handling assembly coupled to the base, the second container handling assembly configured to support a second stack of containers, wherein the second container handling assembly is configured to extend from the autonomous vehicle in the first direction and the second direction.

9. The autonomous vehicle of claim 8, wherein the controller is further configured to:
  determine that the first container handling assembly and the second container handling assembly are extended in the first direction;
  determine a first weight of the first stack of containers;
  determine a second weight of the second stack of containers; and
  dynamically adjust the electromagnetic force generated by the first electromagnet based at least in part on the first weight and the second weight.

10. The autonomous vehicle of claim 8, wherein the controller is further configured to:
  determine that the first container handling assembly is extended in the first direction;
  determine that the second container handling assembly is extended in the second direction;
  determine a difference between a first weight of the first stack of containers and a second weight of the second stack of containers; and
  dynamically adjust the electromagnetic force generated by the first electromagnet based at least in part on the difference.

11. The autonomous vehicle of claim 4, wherein the controller is further configured to:
  determine that a weight of the first stack of containers is greater than a threshold prior to energizing the first electromagnet.

12. The autonomous vehicle of claim 11, wherein the controller is further configured to:
  determine, based at least in part on feedback from one or more sensors, a total weight of the autonomous vehicle; and
  determine the threshold based at least in part on the total weight.

13. The autonomous vehicle of claim 4, wherein the controller is further configured to:
  determine a weight of the first stack of containers; and
  dynamically adjust the electromagnetic force generated by the first electromagnet based at least in part on the weight.

14. The autonomous vehicle of claim 4, further comprising:
  a battery coupled to the first electromagnet.

15. A method comprising:
  determining, by one or more computer processors coupled to memory, that a first stack of containers is loaded onto a first container handling assembly of an autonomous vehicle, wherein the first container handling assembly is configured to extend from the autonomous vehicle in a first direction beyond a first side of the autonomous vehicle, and a second direction beyond a second side of the autonomous vehicle;
  determining that a second stack of containers is loaded onto a second container handling assembly of the autonomous vehicle, wherein the second container handling assembly is configured to extend in the first direction and the second direction; and
  energizing a first electromagnet when the first container handling assembly is in an extended position in the first direction, such that the autonomous vehicle is stabilized via an electromagnetic force generated by the first electromagnet.

16. The method of claim 15, further comprising:
  determining a weight of the first stack of containers; and
  adjusting the electromagnetic force generated by the first electromagnet based at least in part on the weight.

17. The method of claim 15, further comprising:
  determining that a weight of the first stack of containers is greater than a threshold prior to energizing the first electromagnet.

18. The method of claim 15, further comprising:
  determining that the first container handling assembly and the second container handling assembly are extended in the first direction;

determining a first weight of the first stack of containers;
determining a second weight of the second stack of containers; and
adjusting the electromagnetic force generated by the first electromagnet based at least in part on the first weight and the second weight.

19. The method of claim 15, further comprising:
determining that the first container handling assembly is extended in the first direction;
determining that the second container handling assembly is extended in the second direction;
determining a difference between a first weight of the first stack of containers and a second weight of the second stack of containers; and
adjusting the electromagnetic force generated by the first electromagnet based at least in part on the difference.

\* \* \* \* \*